(12) United States Patent
Lee et al.

(10) Patent No.: US 6,802,661 B1
(45) Date of Patent: Oct. 12, 2004

(54) METHOD OF INPUTTING ALPHANUMERIC CODES BY MEANS OF 12 KEYS

(76) Inventors: Kai Tai Lee, Flat H, 16/F., Tower 1, Bayshore Towers, 608 Sai Sha Road, Ma On Shan, Hong Kong (CN); Yin Hung Lam, Flat H, 16/F., Tower 1, Bayshore Towers, 608 Sai Sha Road, Ma On Shan, Hong Kong (CN)

(*) Notice: Subject to any disclaimer, the term of this patent is extended or adjusted under 35 U.S.C. 154(b) by 0 days.

(21) Appl. No.: 10/654,293

(22) Filed: Aug. 29, 2003

(51) Int. Cl.[7] ............................ B41J 5/08; B41J 5/10; B41J 5/12; B41J 5/14; B41J 5/16; B41J 5/26; B41J 5/28

(52) U.S. Cl. .................. 400/486; 400/489; 341/22; 345/168; 345/169

(58) Field of Search ................................. 400/486, 489; 341/22; 345/168, 169; G06F 3/023, 3/02

(56) References Cited

U.S. PATENT DOCUMENTS 6,102,594 A * 8/2000 Str.o slashed.m ........... 400/486
6,231,252 B1 * 5/2001 Kitamura .................... 400/484
6,356,258 B1 * 3/2002 Kato et al. .................. 345/168

* cited by examiner

*Primary Examiner*—Andrew H. Hirshfeld
*Assistant Examiner*—Marissa L Ferguson

(57) ABSTRACT

The present invention relates to a method of inputting alphanumeric codes by pressing no more than 2 keys on a keypad of 12 keys arranged in a matrix of 4 rows and 3 columns for each mode. It comprises a set of up to 12 tables arranging in a matric of 4 rows and 3 columns, each table containing 12 alphanumeric codes of identical or similar nature arranging in a matrix of 4 rows and 3 columns. To input an alphanumeric code, the user presses a key on the keypad in location corresponding to the location of the desired table in the matrix and then presses a key in location corresponding to the location of the desired code in the table. The invention can serve as a user interface for input of codes in handheld electronic devices or as a means for high level language communications among electronic devices.

4 Claims, 2 Drawing Sheets

| a | b | c |
|---|---|---|
| d | e | f |
| g | h | i |
| j | k | l |

| m | n | o |
|---|---|---|
| p | q | r |
| s | t | u |
| v | w | x |

| y | z | <space> |
|---|---|---|
|  | <up> | <back space> |
| <left> | <tab> | <right> |
|  | <down> | <delete> |

| , | = | - |
|---|---|---|
| . | x | / |
| ( | $ | ) |
| < | = | > |

| ; | : | \ |
|---|---|---|
| : | " | ' |
| % | ? | & |
| @ | ! | _ |

| [ | ~ | ] |
|---|---|---|
| { | ^ | } |
| ¢ | £ | ¥ |
|   |   |   |

| A | B | C |
|---|---|---|
| D | E | F |
| G | H | I |
| J | K | L |

| M | N | O |
|---|---|---|
| P | Q | R |
| S | T | U |
| V | W | X |

| Y | Z |   |
|---|---|---|
| <esc> | <shift> |   |
| <alt> | <ctrl> | <enter> |
| <home> | <insert> | <end> |

|   |   |   |
|---|---|---|
|   |   |   |
|   |   |   |
|   |   |   |

| 1 | 2 | 3 |
|---|---|---|
| 4 | 5 | 6 |
| 7 | 8 | 9 |
| * | 0 | # |

|   |   |   |
|---|---|---|
|   |   |   |
|   |   |   |
|   |   |   |

| a | b | c |
|---|---|---|
| d | e | f |
| g | h | i |
| j | k | l |

| m | n | o |
|---|---|---|
| p | q | r |
| s | t | u |
| v | w | x |

| y | z | <space> |
|---|---|---|
|  | <up> | <back space> |
| <left> | <tab> | <right> |
|  | <down> | <delete> |

| , | = | - |
|---|---|---|
| . | x | / |
| ( | $ | ) |
| < | ≈ | > |

| : | ; | \ |
|---|---|---|
| ' | " | ` |
| % | ? | & |
| @ | ! | _ |

| [ | ~ | ] |
|---|---|---|
| { | ^ | } |
| ¢ | £ | ¥ |
|   |   |   |

| A | B | C |
|---|---|---|
| D | E | F |
| G | H | I |
| J | K | L |

| M | N | O |
|---|---|---|
| P | Q | R |
| S | T | U |
| V | W | X |

| Y | Z |   |
|---|---|---|
| <esc> | <shift> |   |
| <alt> | <ctrl> | <enter> |
| <home> | <insert> | <end> |

|   |   |   |
|---|---|---|
|   |   |   |
|   |   |   |
|   |   |   |

| 1 | 2 | 3 |
|---|---|---|
| 4 | 5 | 6 |
| 7 | 8 | 9 |
| * | 0 | # |

|   |   |   |
|---|---|---|
|   |   |   |
|   |   |   |
|   |   |   |

FIG.1

METHOD OF INPUTTING ALPHANUMERIC CODES BY MEANS OF 12 KEYS

BACKGROUND OF THE INVENTION

The invention relates to a method of inputting letters, numbers, punctuation marks, mathematical and other conventional symbols and any other alphanumeric codes using 12 keys instead of using over 80 keys on a conventional computer keyboard. More particularly the invention pertains to a new method of inputting alphanumeric codes by means of pressing no more than 2 keys for each alphanumeric code.

For handheld electronic devices such as mobile phones, owing to their small size, it is not possible to have letter keypads such as those in portable computers. The user has to press the keys many times in order to input an alphanumeric code. If the user has to input a number of alphanumeric codes to constitute a message, it will be very time-consuming and tedious. Therefore, a faster and convenient method of inputting alphanumeric codes is in need. Further, existing communication systems among electronic devices use low level signaling or protocol to communicate, which is not understood by users. It is also proved to be difficult for different manufacturers to agree on the signaling or protocol to be used so that different electronic devices can communicate with one another. A high level language enabling communications among electronic devices and facilitating universal interoperability is generally required.

BRIEF SUMMARY OF THE INVENTION

In view of the aforesaid disadvantages now present in the prior art, the present invention provides a new method of inputting alphanumeric codes quickly and conveniently, which can be used as a user interface for input of alphanumeric codes in handheld electronic devices or as a means for high level language communications among electronic devices.

To attain this, the present invention provides a method of inputting alphanumeric codes by means of pressing no more than 2 keys out of 12 keys on a keypad arranged in a matrix of 4 rows and 3 columns for each alphanumeric code which comprises the steps of (a) having a set of up to 12 tables arranging in a matrix of 4 rows and 3 columns, each table containing 12 different alphanumeric codes of the same or similar nature also arranging in a matrix of 4 rows and 3 columns;

(b) pressing a key on the keypad, the location of which corresponds to the location of the table in the matrix which contains the desired alphanumeric code to be inputted; and (c) then pressing a key on the keypad, the location of which corresponds to the location of the desired alphanumeric code in the matrix of the table selected.

For practical use, each of the tables may contain function keys as well as alphanumeric codes so long as each table contains a maximum of 12 different alphanumeric codes or function keys.

For ease of memory, the tables are to be arranged in a manner that alphanumeric codes or function keys of the same or similar nature are included in the same table or in two or more successive tables.

According to the usage frequency of various alphanumeric codes or function keys, it is preferable to have the following matrix of tables:

(a) First row, first column in the matrix: letters <a> to <l> in lower case reading from left to right and from top to bottom in sequence;

(b) First row, second column in the matrix: letters <m> to <x> in lower case reading from left to right and from top to bottom in sequence;

(c) First row, third column in the matrix: letters <y> and <z> in lower case, function keys <space>, , <up>, <back space>, <left>, <tab>, <right>, , <down> and <delete> reading from left to right and from top to bottom in sequence;

(d) Second row, first column in the matrix: symbols <,>, <+>, <->, <.>, <x>, </>, <(>, <$>, <)>, <<>, <=> and <>> reading from left to right and from top to bottom in sequence;

(e) Second row, second column in the matrix: symbols <;>, <:>, <\>, <>, <">, <'>, <%>, <?>, <&>, <@>, <!> and <_> reading from left to right and from top to bottom in sequence;

(f) Second row, third column in the matrix: symbols <[>, <~>, <]>, <{>, <^>, <}>, <¢>, <£>, <¥> reading from left to right and from top to bottom in sequence with the three positions in the last row reserved for future development;

(g) Third row, first column in the matrix: letters <A> to <L> in upper case reading from left to right and from top to bottom in sequence;

(h) Third row, second column in the matrix: letters <M> to <X> in upper case reading from left to right and from top to bottom in sequence;

(i) Third row, third column in the matrix: letters <Y> and <Z> in upper case with the last position in the first row reserved for future development, function keys <esc> and <shift> with the last position in the second row also reserved for future development, function keys <alt>, <ctrl>, <enter>, <home>, <insert> and <end> reading from left to right and from top to bottom in sequence;

(j) Fourth row, first column in the matrix: reserved for future development;

(k) Fourth row, second column in the matrix: numbers <1> to <9>, symbol <*>, number <0> and symbol <#> reading from left to right and from top to bottom in sequence;

(l) Fourth row, third column in the matrix: reserved for future development; and up to a maximum of 144 alphanumeric codes or function keys can be contained in a matrix of 12 tables.

To facilitate fast input, the display screen of the electronic device may show the table selected so that the user can see and choose from the table the desired alphanumeric code or function key.

To facilitate fast input, for those electronic devices such as mobile phones which have a typical keypad of 12 keys arranged in a matrix of 4 rows and 3 columns reading from left to right and from top to bottom in sequence number keys <1> to <9>, symbol key <*>, number key <0> and symbol key <#>, the outlook of the 12 keys on the keypad can be re-designed by adding 1. to the upper left hand corner of each key the alphanumeric code in the table in the first row, first column in the matrix and the location of the alphanumeric code in the table corresponds to the location of the key on the keypad; 2. to the upper right hand corner of each key the alphanumeric code in the table in the first row, second column in the matrix and the location of the alphanumeric code in the table corresponds to the location of the key on the keypad; 3. to the lower left hand corner of each key the alphanumeric code in the table in the second row, first column in the matrix and the location of the alphanumeric code in the table corresponds to the location of the key on the keypad; and 4. to the lower right hand corner of each key the alphanumeric code in the table in the second row, second column in the matrix and the location of the alphanumeric code in the table corresponds to the location of the key on the keypad; and the outlook of the 12 keys is re-designed in detail as follows:

(a) Number key <1>: adding letter <a> at upper left hand corner, letter <m> at upper right hand corner, symbol <,> at lower left hand corner and symbol <;> at lower right hand corner;

(b) Number key <2>: adding letter <b> at upper left hand corner, letter <n> at upper right hand corner, symbol <+> at lower left hand corner and symbol <:> at lower right hand corner;

(c) Number key <3>: adding letter <c> at upper left hand corner, letter <o> at upper right hand corner, symbol <−> at lower left hand corner and symbol <\> at lower right hand corner;

(d) Number key <4>: adding letter <d> at upper left hand corner, letter <p> at upper right hand corner, symbol <.> at lower left hand corner and symbol <'> at lower right hand corner;

(e) Number key <5>: adding letter <e> at upper left hand corner, letter <q> at upper right hand corner, symbol <x> at lower left hand corner and symbol <"> at lower right hand corner;

(f) Number key <6>: adding letter <f> at upper left hand corner, letter <r> at upper right hand corner, symbol </> at lower left hand corner and symbol <`> at lower right hand corner;

(g) Number key <7>: adding letter <g> at upper left hand corner, letter <s> at upper right hand corner, symbol <(> at lower left hand corner and symbol <%> at lower right hand corner;

(h) Number key <8>: adding letter <h> at upper left hand corner, letter <t> at upper right hand corner, symbol <$> at lower left hand corner and symbol <?> at lower right hand corner;

(i) Number key <9>: adding letter <i> at upper left hand corner, letter <u> at upper right hand corner, symbol <)> at lower left hand corner and symbol <&> at lower right hand corner;

(j) Key <*>: adding letter <j> at upper left hand corner, letter <v> at upper right hand corner, symbol <> at lower left hand corner and symbol <@> at lower right hand corner;

(k) Number key <0>: adding letter <k> at upper left hand corner, letter <w> at upper right hand corner, symbol <=> at lower left hand corner and symbol <!> at lower right hand corner; and (l) Key <#>: adding letter <l> at upper left hand corner, letter <x> at upper right hand corner, symbol <>> at lower left hand corner and symbol <_> at lower right hand corner.

Where the electronic devices have more than 12 keys, to simplify the input process and to facilitate fast input, additional functions can be performed by using the additional keys. Additional functions include, without limitation, interchanging of upper case and lower case, moving up to a preceding table and locking to it and thus saving the presses to select the table for all subsequent alphanumeric codes or function keys in the same table, moving down to a following table and locking to it for the same aforesaid function, resetting to the original 2-press mode for inputting one alphanumeric code or function key and representing most commonly used alphanumeric codes such as <a>, <e>, <i>, <o>, <u> or function keys such as <space>, <delete>, <enter>, <esc>.

The present invention is applicable in Latin-alphabet languages with some uncommon letters used in specific languages added, if necessary. The present invention can also be applicable in other languages by devising a matrix of tables containing different syllables, characters or equivalents, for example, hiragana or katakana of the Japanese syllables.

It is an object of the present invention to provide a new method of inputting alphanumeric codes quickly by means of pressing no more than 2 keys out of 12 keys for each alphanumeric code.

It is another object of the present invention to provide a new method which can serve as a user interface for fast and easy input of alphanumeric codes and function keys in handheld electronic devices, thus overcoming the disadvantages of the prior art.

It is a further object of the present invention to provide a new method which can serve as a means of data representation enabling coding and transmission of data in high level language among different electronic devices, for example, through Dual Tone Multi-frequency (DTMF) which are commonly used in telephone networks with two signals representing one alphanumeric code or through other data networks, thus overcoming the disadvantages of the prior art.

BRIEF DESCRIPTION OF THE DRAWINGS

FIG. 1 shows a matrix of tables of the present invention.

DETAILED DESCRIPTION OF THE INVENTION

Figure 2:
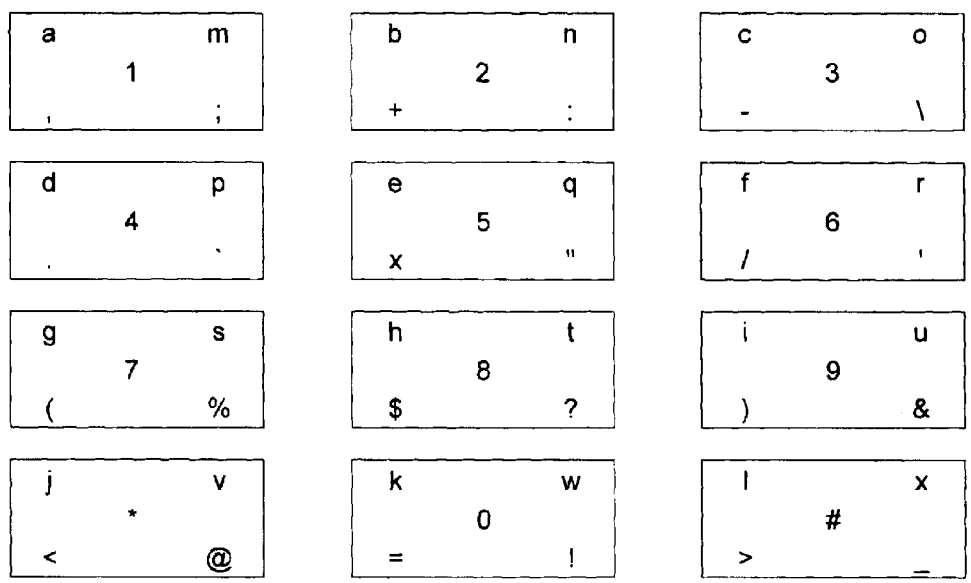
FIG. 2 shows the outlook of the 12 keys for the present invention.

In an embodiment of the present invention as illustrated in FIG. 1, 10 tables are prepared in a matrix of 4 rows and 3 columns, each table contains a maximum of 12 alphanumeric codes or function keys also in a matrix of 4 rows and 3 columns and the details are as follows:

(a) Table in first row, first column of the matrix: letter s <a> to <l> in lower case reading from left to right and from top to bottom in sequence;

(b) Table in first row, second column of the matrix: letters <m> to <x> in lower case reading from left to right and from top to bottom in sequence;

(c) Table in first row, third column of the matrix: letters <y> and <z> in lower case, function keys <space>, , <up>, <back space>, <left>, <tab>, <right>, , <down> and <delete> reading from left to right and from top to bottom in sequence;

(d) Table in second row, first column of the matrix: symbols <,>, <+>, <−>, <.>, <x>, </>, <(>, <$>, <)>, <<>, <=> and <>> reading from left to right and from top to bottom in sequence;

(e) Table in second row, second column of the matrix: symbols <;>, <:>, <\>, <>, <">, <'>, <%>, <?>, <&>, <@>, <!> and <_> reading from left to right and from top to bottom in sequence;

(f) Table in second row, third column of the matrix: symbols in a <[>, <~>, <]>, <{>, <^>, <}>, <¢>, <£>, <¥> reading from left to right and from top to bottom in sequence with the three positions in the last row reserved for future development;

(g) Table in third row, first column of the matrix: letters <A> to <L> in upper case reading from left to right and from top to bottom in sequence;

(h) Table in third row, second column of the matrix: letters <M> to <X> in upper case reading from left to right and from top to bottom in sequence;

(i) Table in third row, third column of the matrix: letters <Y> and <Z> in upper case with the last position in the first row reserved for future development, function keys <esc> and <shift> with the last position in the second row also reserved for future development, function keys <alt>, <ctrl>, <enter>, <home>, <insert> and <end> reading from left to right and from top to bottom in sequence;

(j) Table in fourth row, first column of the matrix: reserved for future development;

(k) Table in fourth row, second column of the matrix: numbers <1> to <9>, symbol <*>, number <0> and symbol <#> reading from left to right and from top to bottom in sequence; and (l) Table in fourth row, third column of the matrix: reserved for future development.

When the user wishes to input an alphanumeric code or function key, the user may first press the key in location corresponding to the location of the table in the matrix which contains the desired alphanumeric code or function key. The user can then press the key in location corresponding to the location of the desired alphanumeric code or function key in the table as selected. By pressing a maximum of 2 keys, the user can input the desired alphanumeric code or function key.

If the user wishes to enter the letter <z> in lower case, he can press the key in first row, third column of the keypad, which in location corresponds to the table in first row, third column of the matrix. He can then press the key in first row, second column of the keypad, which in location corresponds to the letter <z> in first row, second column of the selected table.

If the user wishes to enter the symbol <$>, he can press the key in second row, first column of the keypad, which in location corresponds to the table in second row, first column of the matrix. He can then press the key in third row, second column of the keypad, which in location corresponds to the symbol <$> in third row, second column of the selected table.

In another embodiment of the present invention as shown in FIG. 2, to facilitate fast input, the first embodiment can be used together with a new outlook of the 12 keys, which is derived from the outlook of the 12 keys on a typical keypad of an electronic device such as mobile phone by adding 1. to the upper left hand corner of each key the alphanumeric code in the table in the first row, first column in the matrix and the location of the alphanumeric code in the table corresponds to the location of the key on the keypad; 2. to the upper right hand corner of each key the alphanumeric code in the table in the first row, second column in the matrix and the location of the alphanumeric code in the table corresponds to the location of the key on the keypad; 3. to the lower left hand corner of each key the alphanumeric code in the table in the second row, first column in the matrix and the location of the alphanumeric code in the table corresponds to the location of the key on the keypad; and 4. to the lower right hand corner of each key the alphanumeric code in the table in the second row, second column in the matrix and the location of the alphanumeric code in the table corresponds to the location of the key on the keypad; and the outlook of the 12 keys is detailed as follows:

(a) Number key <1>: adding letter <a> at upper left hand corner, letter <m> at upper right hand corner, symbol <,> at lower left hand corner and symbol <;> at lower right hand corner;

(b) Number key <2>: adding letter <b> at upper left hand corner, letter <n> at upper right hand corner, symbol <+> at lower left hand corner and symbol <:> at lower right hand corner;

(c) Number key <3>: adding letter <c> at upper left hand corner, letter <o> at upper right hand corner, symbol <-> at lower left hand corner and symbol <\> at lower right hand corner;

(d) Number key <4>: adding letter <d> at upper left hand corner, letter <p> at upper right hand corner, symbol <.> at lower left hand corner and symbol <'> at lower right hand corner;

(e) Number key <5>: adding letter <e> at upper left hand corner, letter <q> at upper right hand corner, symbol <x> at lower left hand corner and symbol <"> at lower right hand corner;

(f) Number key <6>: adding letter <f> at upper left hand corner, letter <r> at upper right hand corner, symbol </> at lower left hand corner and symbol <'> at lower right hand corner;

(g) Number key <7>: adding letter <g> at upper left hand corner, letter <s> at upper right hand corner, symbol <(> at lower left hand corner and symbol <%> at lower right hand corner;

(h) Number key <8>: adding letter <h> at upper left hand corner, letter <t> at upper right hand corner, symbol <$> at lower left hand corner and symbol <?> at lower right hand corner;

(i) Number key <9>: adding letter <i> at upper left hand corner, letter <u> at upper right hand corner, symbol <)> at lower left hand corner and symbol <&> at lower right hand corner;

(j) Key <*>: adding letter <j> at upper left hand corner, letter <v> at upper right hand corner, symbol <<> at lower left hand corner and symbol <@> at lower right hand corner;

(k) Number key <0>: adding letter <k> at upper left hand corner, letter <w> at upper right hand corner, symbol <=> at lower left hand corner and symbol <!> at lower right hand corner; and (l) Key <#>: adding letter <l> at upper left hand corner, letter <x> at upper right hand corner, symbol <>> at lower left hand corner and symbol <_> at lower right hand corner.

When the user wishes to enter the letter <e>, he can look for the key containing the letter <e> and find it at the upper left hand corner of number key <5>. As it is at the upper left hand corner, the user presses the key in first row, first column of the keypad and then press the number key <5> and the letter <e> will be inputted.

When the user wishes to enter the letter <o>, he can look for the key containing the letter <o> and find it at the upper right hand corner of number key <3>. As it is at the upper right hand corner, the user presses the key in first row, second column of the keypad and then press the number key <3> and the letter <o> will be inputted.

When the user wishes to enter the symbol <,>, he can look for the key containing the symbol <,> and find it at the lower left hand corner of number key <1>. As it is at the lower left hand corner, the user presses the key in second row, first column of the keypad and then press the number key <1> and the symbol <,> will be inputted.

When the user wishes to enter the symbol <!>, he can look for the key containing the symbol <!> and find it at the lower right hand corner of number key <0>. As it is at the lower right hand corner, the user presses the key in second row, second column of the keypad and then press the number key <0> and the symbol <!> will be inputted.

In a further embodiment of the present invention, where the electronic device has only 4 additional keys in addition to the 12 keys on the keypad, to simplify the input process and to facilitate fast input, the 4 additional keys can be set as follows:

(a) First additional key: by pressing once, it will change the existing upper case mode to lower case mode or vice versa and lock to that mode, and this should save the user from locating the table that contains the letter in the desired mode;

(b) Second additional key: by pressing once, it will move up to a preceding table and locking to it and thus saving the presses to select the table for all subsequent alphanumeric codes or function keys in the same table;

(c) Third additional key: by pressing once, it will move down to a following table and locking to it and thus saving the presses to select the table for all subsequent alphanumeric codes or function keys in the same table;

(d) Fourth additional key: by pressing once, it will cancel the functions of the additional keys and reset to the original 2-press mode for inputting one alphanumeric code or function key.

For application in a handheld electronic device such as a mobile phone, the user can apply the invention by means of the typical keypad on a mobile phone, that is; number keys <1> to <9>, symbol <*>, number key <0> and symbol <#> arranged in a matrix of 4 rows and 3 columns. To input an alphanumeric code, for example, the letter <l>, the user can press the number key <7> and then press the number key <9> and the letter <I> will be inputted. Therefore, if the user wishes to input a message such as <I love you.>, he can press number keys in sequence as <7, 9, 3, 3, 1, #, 2, 3, 2, *, 1, 5, 3, 3, 3, 1, 2, 3, 2, 9, 4, 4> to input the message <I love you.>. It is faster and easier to write long messages in comparison with the existing input method.

For application as a high level language communication means among electronic devices, the user can input English commands such as <on> by pressing <2, 3, 2, 2> or <off> by pressing <2, 3, 1, 6, 1, 6> on a 12-key keypad of an electronic device, for example, a mobile phone, and send the commands to another electronic device, for example, an air conditioner or a security alarm, which is installed with a decoder to execute the commands received. From the viewpoint of the users, it is easier to use as there should be no need to understand or follow the different procedures for operating different electronic devices. From the viewpoint of the manufacturers, English can be used as a communication means among electronic devices and they can achieve universal interoperability of their own electronic devices without reaching any agreement with other manufacturers.

As to a further discussion of the manner of usage and operation of the present invention, the same should be apparent from the above description. Accordingly, no further discussion relating to the manner of usage and operation is provided.

The present invention is capable of other embodiments and of being practiced and carried out in various ways. It is to be understood that the phraseology and terminology employed herein are for the purpose of description and should not be regarded as limiting.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to falling within the scope of the invention.

What is claimed is:

1. A method of inputting alphanumeric codes by means of pressing no more than 2 keys out of 12 keys on a keypad arranged in a matrix of 4 rows and 3 columns for each alphanumeric code which comprises the steps of (a) having a set of up to 12 tables arranging in a matrix of 4 rows and 3 columns, each table containing 12 different alphanumeric codes of the same or similar nature also arranging in a matrix of 4 rows and 3 columns;

(b) pressing a key on the keypad, the location of which corresponds to the location of the table in the matrix which contains the desired alphanumeric code to be inputted; and (c) then pressing a key on the keypad, the location of which corresponds to the location of the desired alphanumeric code in the matrix of the table selected.

2. A method of inputting alphanumeric codes by means of pressing no more than 2 keys on a keypad of 12 keys for each alphanumeric code as in claim 1, wherein the matrix of tables include:

(a) Table in first row, first column of the matrix: letters <a> to <l> in lower case reading from left to right and from top to bottom in sequence;

(b) Table in first row, second column of the matrix: letters <m> to <x> in lower case reading from left to right and from top to bottom in sequence;

(c) Table in first row, third column of the matrix: letters <y> and <z> in lower case, function keys <space>, , <up>, <back space>, <left>, <tab>, <right>, , <down> and <delete> reading from left to right and from top to bottom in sequence;

(d) Table in second row, first column of the matrix: symbols <,>, <+>, <−>, <.>, <x>, </>, <(>, <$>, <)>, <<>, <=> and <>> reading from left to right and from top to bottom in sequence;

(e) Table in second row, second column of the matrix: symbols <;>, <:>, <\>, <'>, <">, <`>, <%>, <?>, <&>, <@>, <!> and <_> reading from left to right and from top to bottom in sequence;

(f) Table in second row, third column of the matrix: symbols <[>, <~>, <]>, <{>, <^>, <}>, <¢>, <£>, <¥> reading from left to right and from top to bottom in sequence with the three positions in the last row reserved for future development;

(g) Table in third row, first column of the matrix: letters <A> to <L> in upper case reading from left to right and from top to bottom in sequence;

(h) Table in third row, second column of the matrix: letters <M> to <X> in upper case reading from left to right and from top to bottom in sequence;

(i) Table in third row, third column of the matrix: letters <Y> and <Z> in upper case with the last position in the first row reserved for future development, function keys <esc> and <shift> with the last position in the second row also reserved for future development, function keys <alt>, <ctrl>, <enter>, <home>, <insert> and <end> reading from left to right and from top to bottom in sequence;

(j) Table in fourth row, first column of the matrix: reserved for future development;

(k) Table in fourth row, second column of the matrix: numbers <1> to <9>, symbol <*>, number <0> and symbol <#> reading from left to right and from top to bottom in sequence; and (l) Table in fourth row, third column of the matrix: reserved for future development.

3. A method of inputting alphanumeric codes by means of pressing no more than 2 keys on a keypad of 12 keys for each alphanumeric code as in claim 1, wherein the outlook of each of the 12 keys on the keypad is designed by adding 1) to the upper left hand corner of each key the alphanumeric code in the table in the first row, first column in the matrix and the location of the alphanumeric code in the table corresponds to the location of the key on the keypad; 2) to the upper right hand corner of each key the alphanumeric code in the table in the first row, second column in the matrix and the location of the alphanumeric code in the table corresponds to the location of the key on the keypad; 3) to the lower left hand corner of each key the alphanumeric code in the table in the second row, first column in the matrix and the location of the alphanumeric code in the table corresponds to the location of the key on the keypad; and 4) to the lower right hand corner of each key the alphanumeric code in the table in the second row, second column in the matrix and the location of the alphanumeric code in the table corresponds to the location of the key on the keypad; and the outlook of all the 12 keys is detailed as follows:

(a) Number key <1>: adding letter <a> at upper left hand corner, letter <m> at upper right hand corner, symbol <,> at lower left hand corner and symbol <;> at lower right hand corner;

(b) Number key <2>: adding letter <b> at upper left hand corner, letter <n> at upper right hand corner, symbol <+> at lower left hand corner and symbol <:> at lower right hand corner;

(c) Number key <3>: adding letter <c> at upper left hand corner, letter <o> at upper right hand corner, symbol <−> at lower left hand corner and symbol <\> at lower right hand corner;

(d) Number key <4>: adding letter <d> at upper left hand corner, letter <p> at upper right hand corner, symbol <.> at lower left hand corner and symbol <'> at lower right hand corner;

(e) Number key <5>: adding letter <e> at upper left hand corner, letter <q> at upper right hand corner, symbol <x> at lower left hand corner and symbol <"> at lower right hand corner;

(f) Number key <6>: adding letter <f> at upper left hand corner, letter <r> at upper right hand corner, symbol </> at lower left hand corner and symbol <'> at lower right hand corner;

(g) Number key <7>: adding letter <g> at upper left hand corner, letter <s> at upper right hand corner, symbol <(> at lower left hand corner and symbol <%> at lower right hand corner;

(h) Number key <8>: adding letter <h> at upper left hand corner, letter <t> at upper right hand corner, symbol <$> at lower left hand corner and symbol <?> at lower right hand corner;

(i) Number key <9>: adding letter <i> at upper left hand corner, letter <u> at upper right hand corner, symbol <)> at lower left hand corner and symbol <&> at lower right hand corner;

(j) Key <*>: adding letter <j> at upper left hand corner, letter <v> at upper right hand corner, symbol <<> at lower left hand corner and symbol <@> at lower right hand corner;

(k) Number key <0>: adding letter <k> at upper left hand corner, letter <w> at upper right hand corner, symbol <=> at lower left hand corner and symbol <!> at lower right hand corner, and (l) Key <#>: adding letter <l> at upper left hand corner, letter <x> at upper right hand corner, symbol <>> at lower left hand corner and symbol <_> at lower right hand corner.

4. A method of inputting alphanumeric codes by means of pressing no more than 2 keys on a keypad of 12 keys for each alphanumeric code as in claim 1, wherein the method can cater for direct high level language input by users and communications among users and devices for universal and high interoperability.

* * * * *